Jan. 25, 1927.

J. FARES 1,615,364

ANTITHEFT DEVICE FOR AUTOMOBILES

Filed March 10, 1926

Inventor
Joseph Fares
By Hazard and Miller
Attorneys

Patented Jan. 25, 1927.

1,615,364

UNITED STATES PATENT OFFICE.

JOSEPH FARES, OF LOS ANGELES, CALIFORNIA.

ANTITHEFT DEVICE FOR AUTOMOBILES.

Application filed March 10, 1926. Serial No. 93,607.

My invention is a combined anti-theft device for automobiles and a visor.

A main object of my invention is to prevent theft of an automobile by covering the windshield so that a person cannot see out of same in a forward direction and to lock such cover in position necessitating the use of a key or the like to unlock the cover and remove same to give clear vision.

Another object of my invention is to utilize a visor as an anti-theft device for automobiles by covering the windshield of an automobile so that a person cannot see in a forward direction to drive same and hence preventing theft.

In constructing my invention I utilize a pivoted visor or the equivalent which may be attached on the outside of a windshield to hinge in an up and down direction. The visor may be utilized in the ordinary manner for driving as a protection from glare of the sun and may be swung downwardly and automatically locked to cover the windshield and to prevent forward vision.

A further feature of my invention comprises a type of lock in which an arcuate arm is provided with ratchet teeth engaging a detent in the lock so that the visor may be adjusted to different angles and held locked in such positions or may be completely swung downwardly and locked, requiring a key to unlock the detent to allow swinging of the visor upwardly.

My invention will be more readily understood from the following description and drawings, in which.

Figure 1:
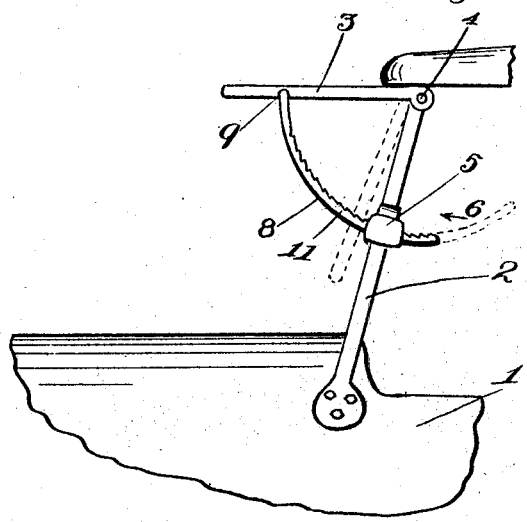
Figure 1 is a side elevation of a windshield of an open car with my combined visor and anti-theft device attached thereto.

Referring to the construction of Fig. 1, the body of the car is designated by the numeral 1 having a windshield frame 2 with a windshield of any suitable type supported therein. A visor 3 is mounted on pivot pins 4 at the upper end of the windshield frame. This visor may be of any suitable shape and of any suitable material such as opaque material or translucent material.

A lock bracket 5 is attached to one side of the windshield frame preferably by clips 6 which would be permanently attached thereto. The lock bracket has an aperture 7 extending therethrough in which fits the arcuate arm 8; this arm being pivotally connected to the visor by any suitable pivot pin as indicated by the numeral 9.

The lock bracket is provided with a detent 10 slidably mounted in the bracket and normally pressed into engagement with rack teeth 11 on the arm by a spring 12. The spring exerts sufficient pressure on the detent to hold the visor in any adjusted position so that in the position indicated in full lines in Fig. 1 the visor may be held upwardly to function as an anti-glare shade in ordinary driving.

The visor may be swung downwardly into the dotted position of Fig. 1, this action pressing the detent 10 upwardly as it rides over the teeth and locking the detent in the dotted position. Thus the detent automatically locks the visor in any adjusted position whether this is a driving position or swung downwardly to form a cover for the windshield. The detent is so positioned inside the bracket that it requires the manipulation of the lock 13 to raise the detent out of engagement with the teeth against the opposition of the spring 12 so that the visor may be swung upwardly.

Figure 4:
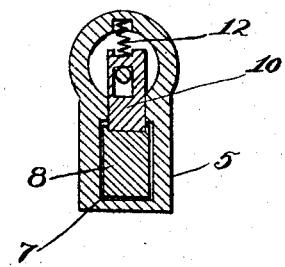
Fig. 4 is a section through the lock on the line 4—4 of Fig. 5.
Figure 2:
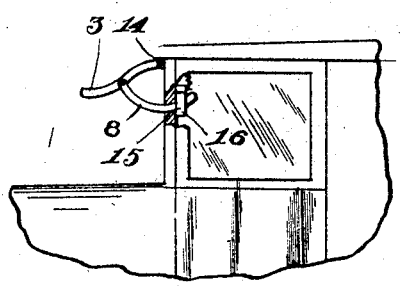
Fig. 2 is a side elevation similar to Fig. 1, showing the device attached to a closed car.
Figure 5:
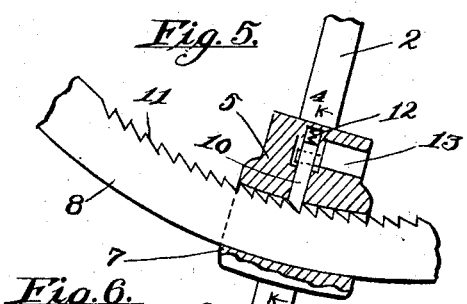
Fig. 5 is a section through the lock, taken substantially on the line 5—5 of Fig. 6, with a barrel lock shown in elevation.
Figure 6:
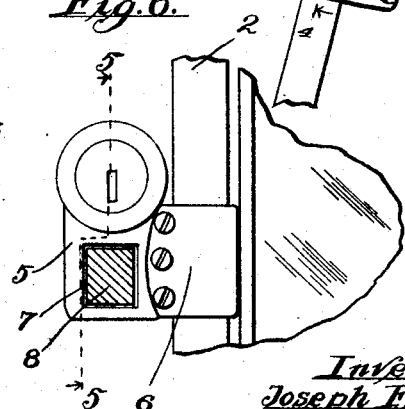
Fig. 6 is an elevation of the lock as if taken in the direction of the arrow 6 of Fig. 1.

The construction of Fig. 2 is substantially the same as that above described, except that in this illustration the visor 3 is shown as a curved formation and has pivots 14 outside of the windshield; the arms 8 extending through a slot 15 or the like in the side frame of the car and passing through a lock bracket 16 on the inside of the car, this lock bracket being secured to the frame of the car in any suitable manner and being substantially of the same type as that shown in Figs. 4, 5 and 6, except for the manner of fastening to the frame of the car.

Figure 3:
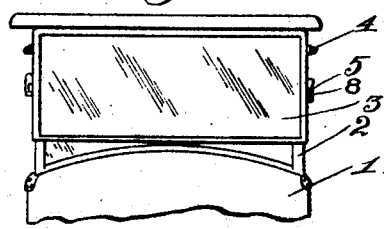
Fig. 3 is a front view of an automobile in elevation, showing the visor down forming an anti-theft device.

It will thus be apparent as shown in Fig. 3, that when the visor is swung downwardly it forms an opaque screen across the windshield preventing a person attempting to steal the car from looking in a forward direction without leaning out of the side of the car. However, should a person attempt to steal the car by looking out of the side they would be noticed by police officers and other people in the street and hence stopped and questioned.

From the above description it will be seen that my invention is of a simple character, making use of a visor or the like to form an opaque screen across the windshield. It will however, be apparent that the device may be made as a separate unit and if desired permanently mounted inside the vehicle to swing downwardly on the inside of the windshield and to swing up against the top when it is desired to drive the car.

It will apparent that various changes in general construction and in specific details may be made to suit my device to different types of automobiles conforming to different windshield arrangements and the construction of the fronts of closed cars. Such changes however, would be within the spirit of my invention as set forth in the description, drawings and claims.

It will be obvious that if a thief attempts to steal an automobile with my anti-theft device thereon by towing, it will be necessary to have someone steer the towed vehicle and as he could not see through the windshield this would be a difficult operation and moreover would be noticed by police officers or other persons.

Having described my invention, what I claim is:

1. An anti-theft device for automobiles comprising a windshield, a visor pivotally mounted adjacent the upper end thereof, an arcuate arm having teeth attached to said visor, a lock having an opening attached to the windshield through which the arm operates a detent mounted in the arm and means to lock the detent in engagement with the arm to hold the visor in close proximity to the windshield to block the view therethrough.

2. An anti-theft device as claimed in claim 1, in which a spring is mounted in the lock normally pressing the detent into engagement with the teeth, adapted to hold the visor in any adjusted position.

3. An anti-theft device for automobiles comprising in combination an automobile windshield frame, a visor pivoted at the upper portion of the frame, a lock bracket attached to one side of the frame, said bracket having an opening therethrough, an arcuate arm having teeth pivotally connected to the visor and sliding through the said openings, a detent slidably mounted in the bracket, a spring normally pressing the detent into engagement with the teeth, whereby the visor may be held in any adjusted position in relation to the windshield and be positioned to block the view therethrough, and a lock to disengage the detent from the teeth.

In testimony whereof I have signed my name to this specification.

JOSEPH FARES.